US012619490B2

(12) United States Patent
Kumar

(10) Patent No.: US 12,619,490 B2
(45) Date of Patent: May 5, 2026

(54) SYSTEM AND METHOD FOR ELECTRONIC INTERACTION RECOVERY VIA MULTIMODAL MACHINE LEARNING MODELS

(71) Applicant: BANK OF AMERICA CORPORATION, Charlotte, NC (US)

(72) Inventor: Dinesh Kumar, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 3 days.

(21) Appl. No.: 18/616,455

(22) Filed: Mar. 26, 2024

(65) Prior Publication Data

US 2025/0307064 A1      Oct. 2, 2025

(51) Int. Cl.
G06F 11/00 (2006.01)
G06F 11/07 (2006.01)

(52) U.S. Cl.
CPC ............................... G06F 11/0793 (2013.01)

(58) Field of Classification Search
CPC .................................................. G06F 11/0793
See application file for complete search history.

(56) References Cited

U.S. PATENT DOCUMENTS

| | | | |
|---|---|---|---|
| 8,688,661 B2 | 4/2014 | Greiner | |
| 10,140,189 B2 | 11/2018 | Fang | |
| 10,664,362 B2 | 5/2020 | Larson | |
| 10,678,445 B2 | 6/2020 | Narayanan | |
| 11,093,348 B2 | 8/2021 | Lei | |
| 2011/0041006 A1 | 2/2011 | Fowler | |
| 2011/0320420 A1 | 12/2011 | Pardon | |
| 2013/0019000 A1 | 1/2013 | Markus | |
| 2013/0339963 A1 | 12/2013 | Greiner | |
| 2019/0357873 A1* | 11/2019 | Uebler | A61B 6/586 |
| 2020/0026589 A1* | 1/2020 | Ghosh | G06F 11/008 |
| 2020/0097389 A1* | 3/2020 | Smith | G06F 11/0793 |
| 2022/0037041 A1* | 2/2022 | Nelson | H04L 63/107 |
| 2022/0092473 A1* | 3/2022 | Lee | G06F 18/251 |
| 2022/0311790 A1* | 9/2022 | Daultani | G06V 10/82 |
| 2022/0382744 A1 | 12/2022 | Budovski | |
| 2023/0315330 A1* | 10/2023 | Li | G06F 3/0655 |
| 2025/0045035 A1* | 2/2025 | Asenov | G06N 3/08 |
| 2025/0147832 A1* | 5/2025 | Agrawal | G06F 11/0769 |
| 2025/0147838 A1* | 5/2025 | Sarkar | G06F 11/0793 |

* cited by examiner

*Primary Examiner* — Joshua P Lottich
(74) *Attorney, Agent, or Firm* — Moore & Van Allen PLLC; Nicholas C. Russell

(57) ABSTRACT

Systems, computer program products, and methods are described herein for electronic interaction recovery via multimodal machine learning models. The present disclosure is configured to receive an attempted electronic interaction from a set of communication channels; analyze the attempted electronic interaction from the set of communication channels associated with the attempted electronic interaction via a multimodal machine learning model (MLM) to detect a set of potential defects within the attempted electronic interaction, where the set of potential defects comprises indicators associated with encountered errors within the attempted electronic interaction; and trigger a recovery process of the attempted electronic interaction via the multimodal MLM.

18 Claims, 6 Drawing Sheets

100

130

140

140

110

NETWORK

140

140

140

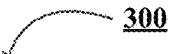

300

RECEIVE AN ATTEMPTED ELECTRONIC INTERACTION FROM A SET OF
COMMUNICATION CHANNELS
302

ANALYZE THE ATTEMPTED ELECTRONIC INTERACTION FROM THE SET OF
COMMUNICATION CHANNELS ASSOCIATED WITH THE INTERACTION VIA A
MULTIMODAL MACHINE LEARNING MODEL (MLM) TO DETECT A SET OF
POTENTIAL DEFECTS WITHIN THE ATTEMPTED ELECTRONIC INTERACTION
304

TRIGGER A RECOVERY PROCESS OF THE ATTEMPTED ELECTRONIC
INTERACTION UPON IDENTIFICATION OF THE SET OF POTENTIAL DEFECTS
WITHIN THE ATTEMPTED ELECTRONIC INTERACTION
306

FIGURE 3

SYSTEM AND METHOD FOR ELECTRONIC INTERACTION RECOVERY VIA MULTIMODAL MACHINE LEARNING MODELS

TECHNOLOGICAL FIELD

Example embodiments of the present disclosure relate to electronic interaction recovery via multimodal machine learning models.

BACKGROUND

Incomplete or defective electronic interactions within an enterprise may cause delays and expenditure of resources to resolve. Analysis and recovery of these electronic interactions may be complicated further due to the plurality of mediums in which they may be generated.

Applicant has identified a number of deficiencies and problems associated with electronic interaction recovery via multimodal machine learning models. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for electronic interaction recovery via multimodal machine learning models. In one aspect, a system for electronic interaction recovery via multimodal machine learning models is presented. The system comprising a processing device, at least one non-transitory storage device, and at least one processing device coupled to the at least one non-transitory storage device wherein the at least one processing device is configured to: receive an attempted electronic interaction from a set of communication channels; analyze the attempted electronic interaction from the set of communication channels associated with the interaction via a multimodal machine learning model (MLM) to detect a set of potential defects within the attempted electronic interaction, wherein the set of potential defects comprises indicators associated with encountered errors within the attempted electronic interaction; and trigger a recovery process of the attempted electronic interaction upon identification of the set of potential defects within the attempted electronic interaction.

In some embodiments, the set of communication channels comprise a set of application logs and a set of electronic communication records.

In some embodiments, analyzing the set of communication channels associated with the attempted electronic interaction via the multimodal MLM further comprises converting the set of electronic communication records into text-based data.

In some embodiments, the set of electronic communication records comprises a set of audio data.

In some embodiments, the set of electronic communication records comprises a set of image-based data.

In some embodiments, the recovery process of the attempted electronic interaction via the multimodal MLM is an automated recovery.

In some embodiments, the recovery process of the attempted electronic interaction via the multimodal MLM is a guided recovery process.

In another aspect, a computer program product for electronic interaction recovery via multimodal machine learning models is presented. The computer program product comprising at least one non-transitory computer-readable medium having computer-readable program code portions embodied therein, the computer-readable program code portions which when executed by a processing device are configured to cause the processor to perform the following operations: receive an attempted electronic interaction from a set of communication channels; analyze the attempted electronic interaction from the set of communication channels associated with the interaction via a multimodal machine learning model (MLM) to detect a set of potential defects within the attempted electronic interaction, wherein the set of potential defects comprises indicators associated with encountered errors within the attempted electronic interaction; and trigger a recovery process of the attempted electronic interaction upon identification of the set of potential defects within the attempted electronic interaction.

In some embodiments, the set of communication channels comprise a set of application logs and a set of electronic communication records.

In some embodiments, analyzing the set of communication channels associated with the attempted electronic interaction via the multimodal MLM further comprises converting the set of electronic communication records into text-based data.

In some embodiments, the set of electronic communication records comprises a set of audio data.

In some embodiments, the set of electronic communication records comprises a set of image-based data.

In some embodiments, the recovery process of the attempted electronic interaction via the multimodal MLM is an automated recovery.

In some embodiments, the recovery process of the attempted electronic interaction via the multimodal MLM is a guided recovery process.

In another aspect, a computer-implemented method for electronic interaction recovery via multimodal machine learning models is presented. The computer-implemented method includes: receiving an attempted electronic interaction from a set of communication channels; analyzing the attempted electronic interaction from the set of communication channels associated with the interaction via a multimodal machine learning model (MLM) to detect a set of potential defects within the attempted electronic interaction, wherein the set of potential defects comprises indicators associated with encountered errors within the attempted electronic interaction; and triggering a recovery process of the attempted electronic interaction upon identification of the set of potential defects within the attempted electronic interaction In some embodiments, the set of communication channels comprise a set of application logs and a set of electronic communication records.

In some embodiments, analyzing the set of communication channels associated with the attempted electronic interaction via the multimodal MLM further comprises converting the set of electronic communication records into text-based data.

In some embodiments, the set of electronic communication records comprises a set of audio data.

In some embodiments, the set of electronic communication records comprises a set of image-based data.

In some embodiments, the recovery process of the attempted electronic interaction via the multimodal MLM is an automated recovery.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
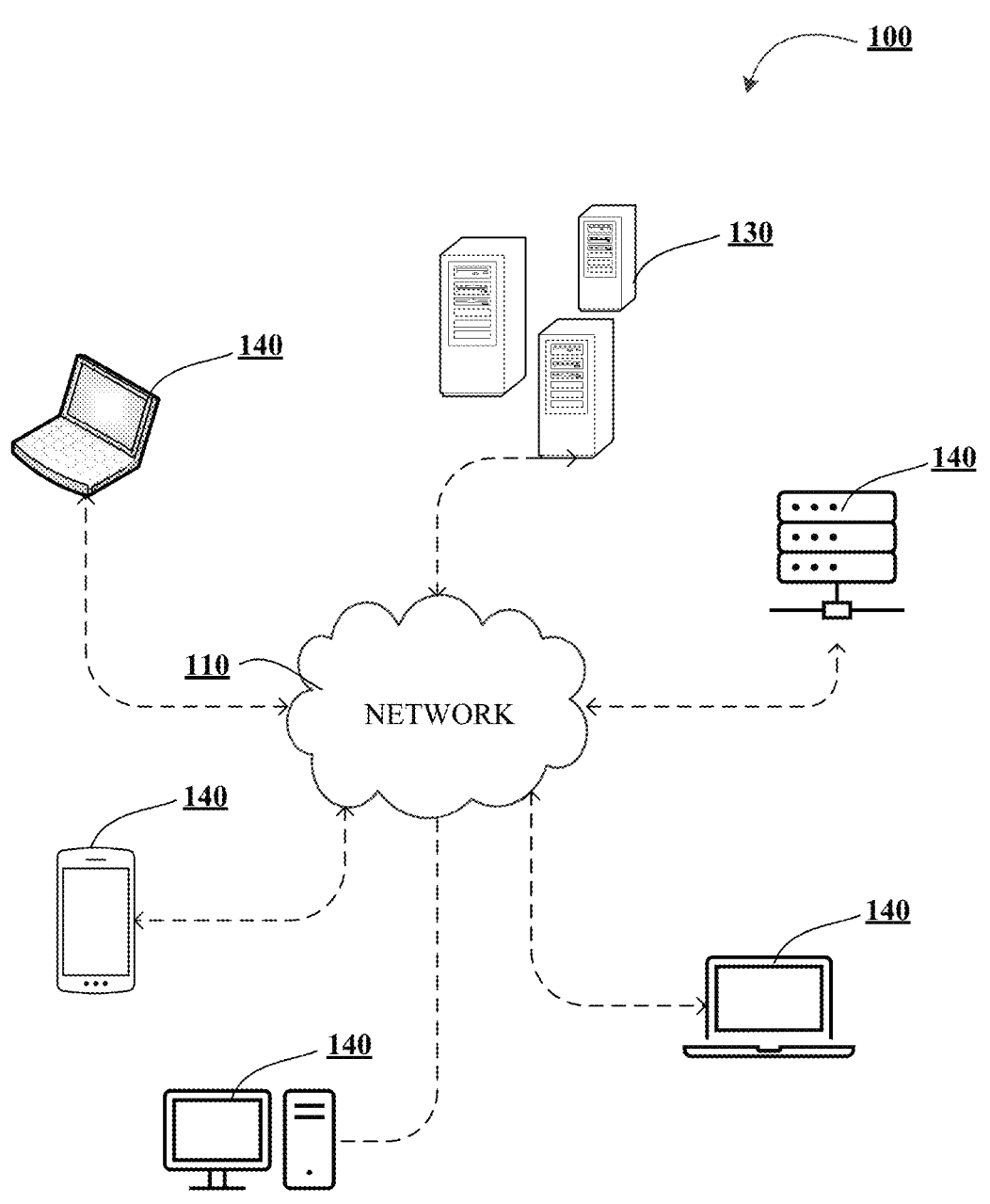
Figure 1B:
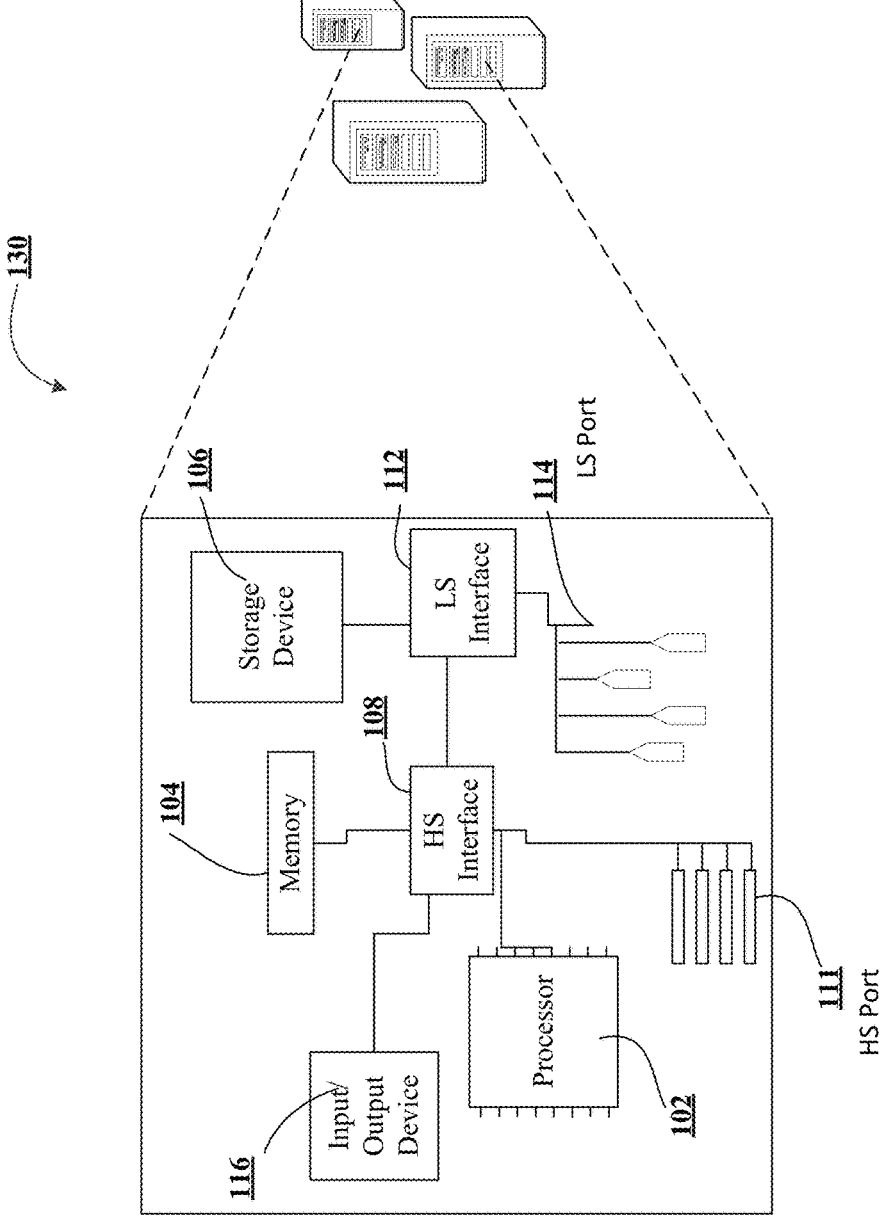
Figure 1C:
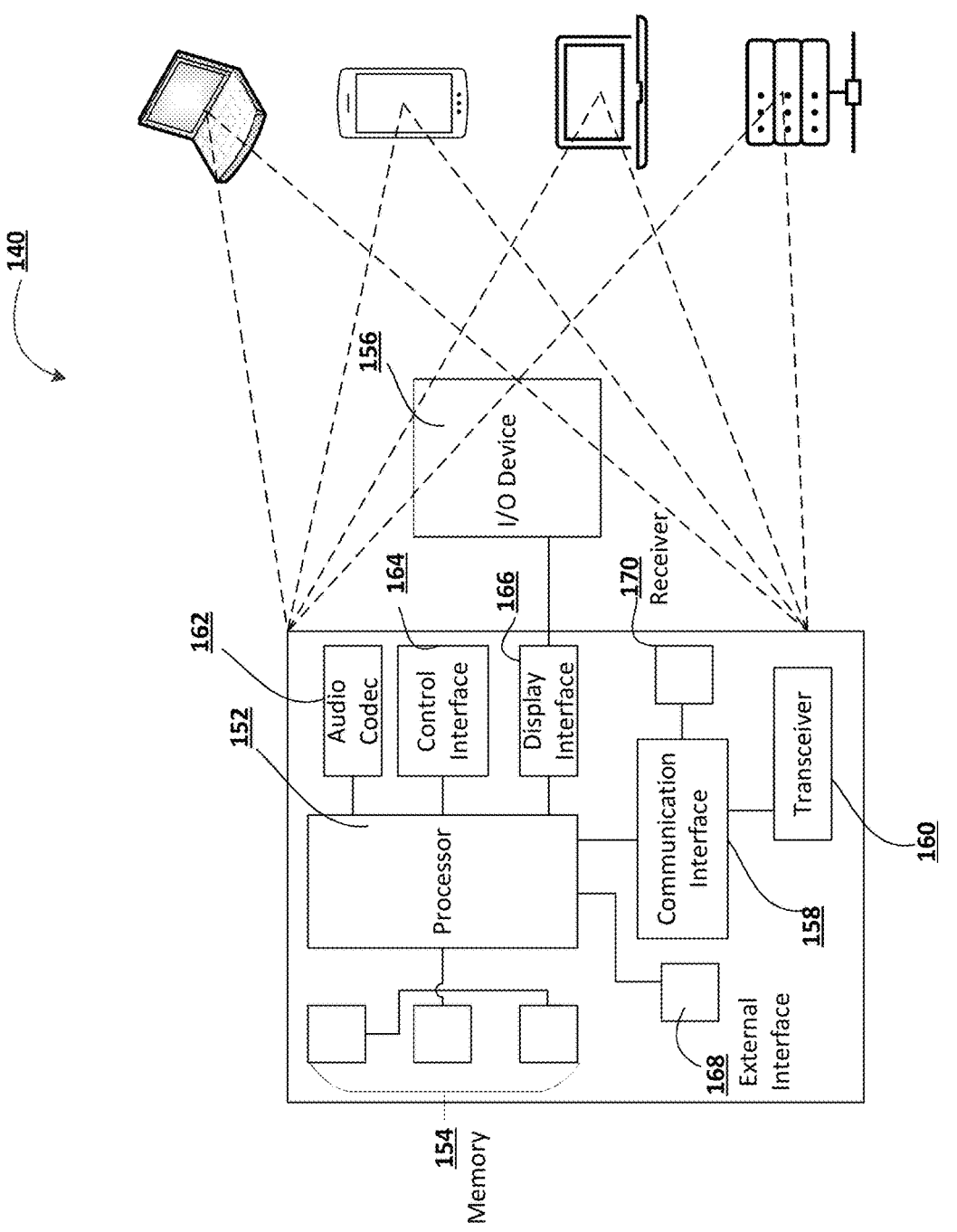
Figure 2:
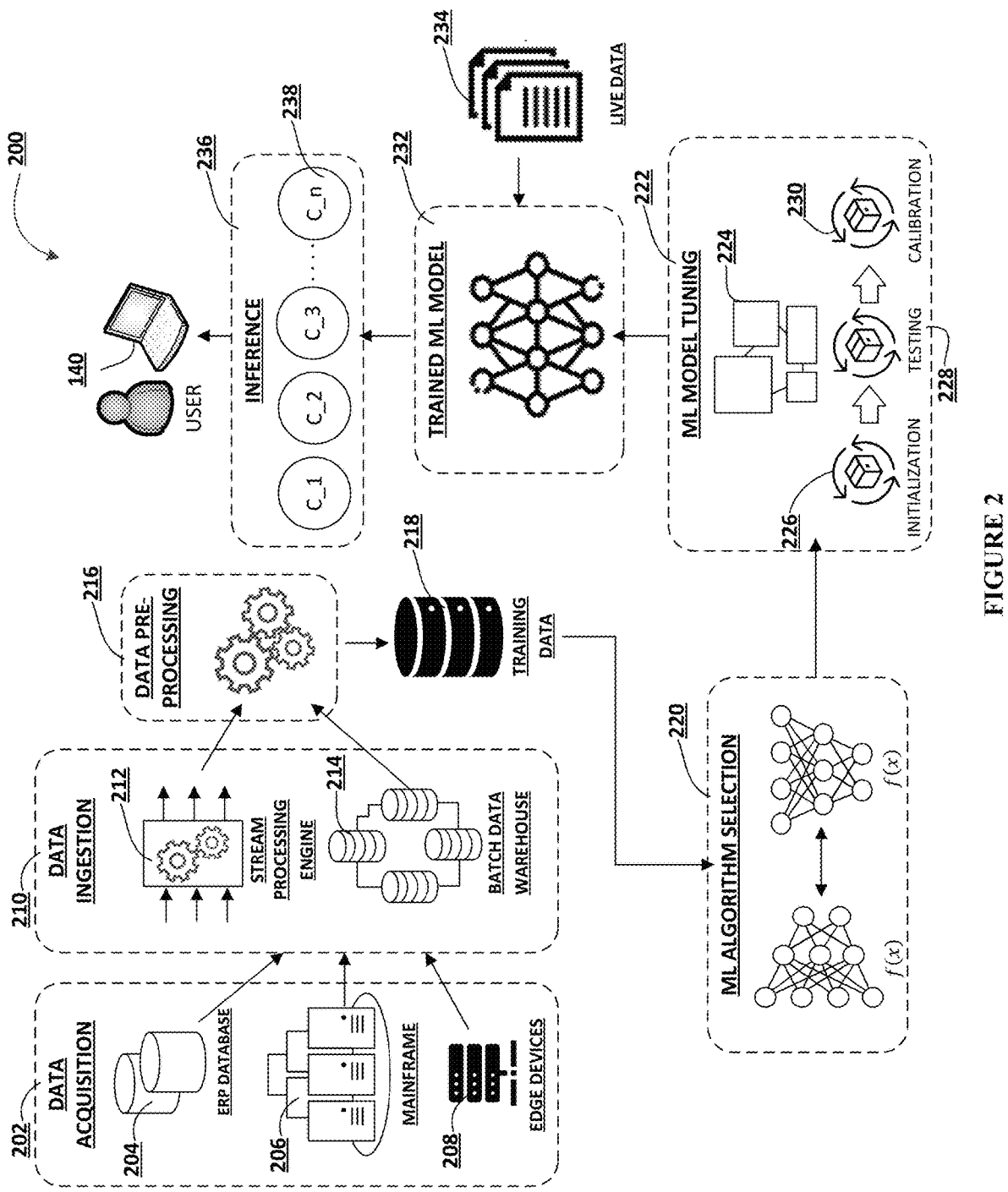
Figure 4:
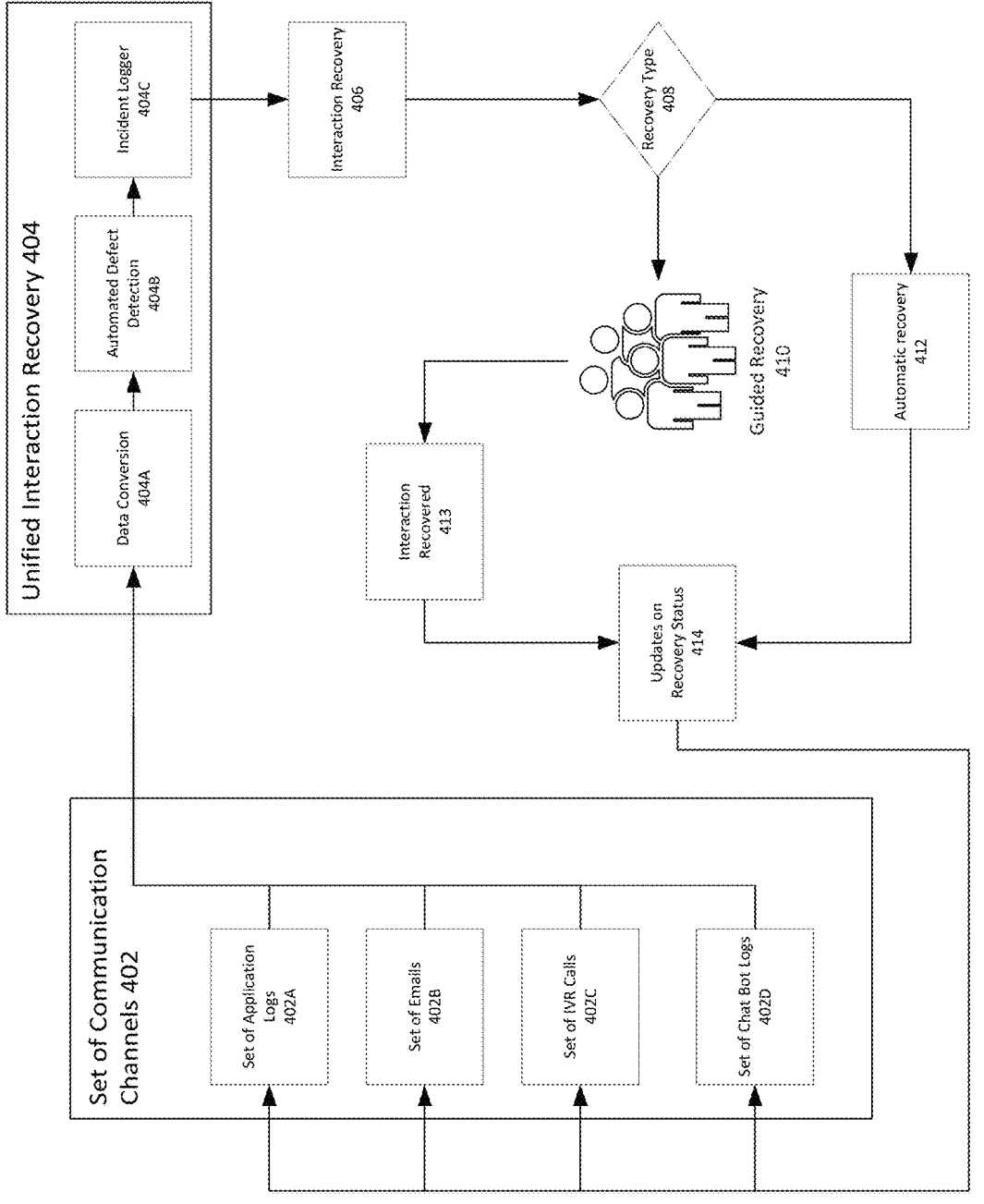

FIGS. 1A-1C illustrate technical components of an exemplary distributed computing environment for electronic interaction recovery via multimodal machine learning models, in accordance with an embodiment of the disclosure;

FIG. 2 illustrates an exemplary machine learning (ML) subsystem architecture in accordance with an embodiment of the disclosure;

FIG. 3 illustrates a process flow for electronic interaction recovery via multimodal machine learning models, in accordance with an embodiment of the disclosure; and FIG. 4 illustrates an exemplary electronic interaction recovery via multimodal machine learning model architecture in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

Electronic interactions within an enterprise may involve multiple applications utilizing multiple forms of communication (e.g., emails, phone calls, chat bots, audio messages, mobile apps, etc.). Attempted interactions may face difficulties in completion, the cause of which may be determined through communications throughout multiple applications and interaction transmissions. If the plurality of communications were concentrated and analyzed, predictions regarding attempted electronic interactions may be made and provide preventative solutions to failed attempts or possible defects.

Determining the root cause of a failed interaction attempt may be difficult, as causes may be scattered through multiple forms of communication. Additionally, causes are diagnosed after the attempted electronic interaction has failed or experienced difficulties. Proactively preventing the causes of the failed electronic interaction may decrease the likelihood of incomplete or defective interactions.

A multimodal machine learning model (MLM) may be used to analyze and preemptively determine the root cause of a potentially incomplete or defective electronic interaction. Multiple communication channels associated with the attempted electronic interaction may include emails, chatbot logs, application logs, interactive voice response (IVR) calls, and the like. The multimodal MLM may receive the attempted electronic interaction request, analyze a set of communication channels associated with the attempted electronic interaction request, and convert the multiple communication channels into a common form (e.g., IVR calls in the form of text may be processed by a natural language processor). The set of communication channels may then be processed by the multimodal MLM to proactively predict delays, defects, errors within the attempted electronic interaction.

Accordingly, the present disclosure describes how a multimodal machine learning model (MLM) may be used to process electronic interactions from various communication channels within an enterprise. Electronic interactions within the enterprise may be conducted via application logs, emails, auditory signals (e.g., IVR calls), chatbot logs/correspondence, and images. The multimodal MLM may analyze the electronic interaction and the associated communication channels the interaction was transmitted through to detect potential defects and causes of incomplete interactions. By detecting potential defects and causes of incomplete electronic interactions, the attempted interaction may be recovered or proactively corrected through an automatic or guided process.

What is more, the present disclosure provides a technical solution to a technical problem. As described herein, the technical problem includes recovering attempted electronic interactions. The technical solution presented herein allows for recovery of attempted electronic interactions via a multimodal machine learning model to proactively prevent incomplete interactions. In particular, electronic interaction recovery via multimodal machine learning models is an improvement over existing solutions to recovering attempted interactions, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for electronic interaction recovery via multimodal machine learning models 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions.

The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process)

with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots . C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots . C\_n$ 238) live data 234 based on how similar they are to one another to solve exploratory challenges where little is known about the data, provide a description or label (e.g., $C\_1, C\_2 \ldots . C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for electronic interaction recovery via multimodal machine learning models. As shown in Block 302, the process flow 300 includes receiving an attempted electronic interaction from a set of communication channels. An attempted electronic interaction may comprise an initiated resource transfer, exchange of resources, and/or incomplete transfers between parties. The attempted electronic interaction may be an initiated, in-process, and/or incomplete electronic interaction associated with an entity, and a second party. For instance, the attempted electronic interaction may be an initiated resource transfer conducted via a set of application logs and a set of electronic communication records, (e.g., chatbots, application logs, emails, interactive voice calls, audio data, image data, etc.) as described in greater detail. The attempted electronic interaction may be received from a set of communication channels (e.g., chatbot correspondence logs and a set of audio data) or at least one communication channel (e.g., chatbot correspondence logs).

In some embodiments, the set of communication channels may be comprised of a set of application logs and a set of electronic communication records. The set of application logs may be entered commands, communications, directives, instructions, and/or messages within an application associated with the attempted electronic interaction. For instance, the set of application logs may be commands entered within an application directing the transfer of resources from a first party to a second party. The set of application logs may indicate a set of potential defects, errors, issues, delays, and/or problems associated with the attempted electronic interaction, which may be analyzed by the multimodal machine learning model (MLM) as described in greater detail below.

In some embodiments, an electronic interaction may be a resource transfer between entities, groups, individuals, and/or a combination thereof. An attempted electronic interaction may be an electronic interaction that has been initiated, is in progress, and/or is ongoing. The electronic interaction may comprise a set of potential defects, which may prevent completion of the attempted interaction. For instance, the set of potential defects may be errors, inaccuracies, unauthorized actions, invalid addresses, incorrect information, and the like.

In some embodiments, IVR calls may be converted from audio data to text data. An IVR call may be a pre-recorded audio response system, and may comprise prerecorded responses, synthesized auditory responses, and/or audio between two parties associated with the attempted electronic interaction. The text data generated from the IVR call may be generated from auditory responses (e.g., responding to pre-recorded or synthesized auditory guides with vocal commands), option selections (e.g., pressing a first button for a first option or a second button for a second option in response to a prompt). Text data from an IVR call may be converted from auditory and electronic signal responses (e.g., pressing buttons to indicate choices in response to auditory signals) to text data, and may be analyzed via the multimodal MLM as described in greater detail below.

In some embodiments, the set of electronic communication records may be comprised of a set of emails and chatbot entries/responses. The set of emails within the set of electronic communication records may be associated with the attempted electronic interaction. The set of emails may be analyzed via the multimodal MLM to recover the attempted electronic interaction, as described in greater detail below.

As shown in Block 304, the process flow 300 includes analyzing the attempted electronic interaction from the set of communication channels associated with the interaction via a multimodal machine learning model (MLM) to detect a set of potential defects within the attempted electronic interaction. Analysis of the set of communication channels associated with the attempted electronic interaction may include consolidating and collecting information associated with the attempted electronic interaction (e.g., auditory data, text data, image data, etc.). For instance, application logs and a set of electronic communication records may be converted into text-based data, then consolidated via the NLP of the multimodal MLM. The collected and consolidated data may then be analyzed for a set of potential defects, errors, missteps, or potential indicators that the attempted electronic interaction may not be completed. The set of potential defects within the attempted electronic interaction may be indicators the electronic interaction may comprise potential errors, including but not limited to previously encountered errors/indicators for a failed and/or incomplete electronic interactions. For instance, the set of potential defects may be improper credentials to conduct the attempted electronic interaction, irregular requests or actions associated with the attempted electronic interaction, incorrect information associated with the attempted interaction, and/or an invalid interaction. Previously encountered errors may be learned delays, defects, issues, warnings, and/or errors encountered in previously encountered/attempted electronic interactions.

The multimodal MLM may be a form of machine learning as described in FIG. 2. The multimodal MLM may process, analyze, and detect a set of potential defects within the received attempted electronic interaction from the set of communication channels. In other words, the multimodal MLM may analyze the attempted electronic interaction from different communication channels or a combination of communication channels. For instance, audio data may be converted into text-based data, which may be analyzed by natural language processing of the multimodal MLM. Similarly, image-based data may be analyzed by converting the image into text-based data and then detecting potential defects within the attempted electronic interaction. Processing and analysis of the attempted electronic interaction conducted via the multimodal MLM may be comprised of analyzing the set of communication channels associated with the attempted electronic interaction. For instance, the multimodal may process audio data, image data, text data, and/or a combination of the set of electronic communication records from the set of communication channels associated with the attempted electronic interaction. In another example, an attempted electronic interaction initiated through a mobile device may be conducted using audio data and image data. The audio data and the image data may be converted into text-based data via the multimodal MLM and analyzed to detect a set of potential defects.

In some embodiments, the multimodal MLM may be predictive of issues associated with the attempted electronic interaction. For instance, the multimodal MLM may be able to predict if an attempted electronic interaction may encounter an error based on previously encountered attempted electronic interactions. The attempted electronic interaction may have an incorrect, invalid, and/or unauthorized command indicating an incomplete and/or defective electronic interaction. The incomplete and/or defective electronic interaction may be reviewed by the multimodal MLM to determine a source of the incomplete/defective electronic interaction.

In some embodiments, chatbot logs may be analyzed via the multimodal MLM. For instance, the attempted electronic interaction may be initiated and/or conducted via chatbot logs within the set of communication channels. The chatbot logs associated with the attempted electronic interaction may be analyzed by the multimodal MLM to detect for potential defects within the attempted electronic interaction, as described in greater detail below.

The set of electronic communication records within the set of communication channels may comprise interactive voice response (IVR) calls, audio messages/audio data, images/image data, or a combination therein. The set of communication channels may be converted from an original form into text-based data. The attempted electronic interaction from the set of communication channels may be transferred and/or converted to a form of text-based data and may be utilized in a natural language processor (NLP) within the multimodal MLM. The NLP may process the set of communication channels associated with information regarding the set of electronic communication records. For instance, an IVR call may comprise audio data which may be converted into text-based data and subsequently processed by the NLP.

In some embodiments, detecting the set of potential defects within the attempted electronic interaction may be conducted through a predetermined list of potential defects within an attempted electronic interaction. For instance, invalid commands, incorrect data entry, invalid transfers, incomplete interactions from poor connectivity, unstable connections, triggers within the attempted electronic interaction and the set of communication channels.

As shown in Block 306, the process flow 300 includes triggering a recovery process of the attempted electronic interaction upon identification of the set of potential defects within the attempted electronic interaction. The triggered recovery process may be comprised of a guided recovery, an automated recovery, or a combination of the two (e.g., the recovery process may use a hybrid mix of automated and guided recovery procedures).

In some embodiments, the recovery process of the attempted electronic interaction via the multimodal MLM is an automated recovery. The automated recovery may be implemented through machine learning models, including but may not be limited to embodiments described in FIG. 2. In other embodiments, the multimodal MLM may identify the set of potential defects and trigger a predetermined response based on the detected defect.

In some embodiments, the recovery process of the attempted electronic interaction via the multimodal MLM is a guided recovery process. The guided recovery process may be conducted via a third party associated with the attempted electronic interaction. For instance, the guided recovery may be implemented by connecting the third party associated with attempted electronic interactions. The third party associated with the attempted electronic interaction may utilize the analysis conducted by the multimodal MLM to determine the root cause of the incomplete/defective electronic interaction and implement measures to correct the error/complete the electronic interaction. The guided recovery process may be implemented through altering inputs, redirecting actions, performing corrective actions, and the like to reduce the attempted electronic interaction from failing and/or generating errors.

In some embodiments, a set of potential defects may be proactively identified within the attempted electronic interaction. Proactive identification of the set of potential defects within the attempted electronic interaction may comprise identifying defects within the interaction before an error, delay, and/or further obstacle to completion of the interaction is encountered. For instance, an attempted electronic interaction received from a set of IVR calls may comprise invalid information that may pause the interaction and prevent completion before proceeding.

Turning now to FIG. 4, an exemplary model of electronic interaction recovery via multimodal MLM is presented. The set of communication channels 402 may comprise a set of application logs 402A, a set of emails 402B, a set of IVR calls 402C, and/or a set of chat bot logs 402D. The set of communication channels 402 may be received by the multimodal MLM. The multimodal MLM may evaluate the set of communication channels 402 during the interaction recovery 404 process to search and evaluate the interaction for a set of potential defects.

As seen in the unified interaction recovery block 404, the attempted electronic interaction may undergo data conversion 404A, automated defect detection 404B, and incident logging 404C. Data conversion 404A may be comprised of converting forms of data associated with the electronic interaction (e.g., image, sounds, logs, code) into text-based data. The text-based data from the data conversion 404A may be used in a natural language processor (NLP), which may perform automated defect detection 404B. Automated defect detection 404B may detect a set of potential defects within the attempted electronic interaction, with potential defects being logged in the incident logger 404C. The incident logger 404C may record, log, transcribe, document, and/or track the set of potential defects within the attempted electronic interaction. Upon recording of the set of potential defects associated with the electronic interaction within the incident logger 404C, recovery of the interaction as seen in Block 406 may begin.

Recovery of the attempted electronic interaction within the interaction recovery block 406 may be processed by determining the recovery type 408. The recovery type may include a guided recovery 410, or an automatic recovery 412. In some embodiments, the automatic recovery 412 may be implemented first, followed by the guided recovery 410 if the attempted electronic interaction is unable to be recovered using the automatic recovery. The guided recovery 410 and the automatic recovery 412 may be performed as previously described. Recovery of the attempted electronic interaction may provide updates on the status of the recovery, as seen in block 414 (updates on recovery status). Updates on recovery status 414 associated with recovery of the attempted electronic interaction may comprise transmission of a message to parties associated with the interaction. Updates on recovery status may further be transmitted in the communication channel from which the attempted electronic interaction may have been received. For instance, if the attempted electronic interaction was received through the set of chat bot logs 402D, the updates on recovery status 414 may have been transmitted to the chat bot from which the electronic interaction originated from. Updates on recovery status 414 may be transmitted after the electronic interaction has been recovered or to indicate further errors within the interaction recovery (e.g., the interaction was not recovered through an automatic recovery 412 and a guided recovery 410 may be implemented). The attempted electronic interaction upon recovery may be completed, resume, and/or proceed in the electronic interaction procedure.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for electronic interaction recovery via multimodal machine learning models, the system comprising:

at least one non-transitory storage device; and at least one processing device coupled to the at least one non-transitory storage device, wherein the at least one processing device is configured to:

receive an attempted electronic interaction from a set of communication channels, wherein the set of communication channels comprises a set of application logs and a set of electronic communication records and wherein the set of electronic communication records comprises a set of image-based data;

analyze the attempted electronic interaction from the set of communication channels associated with the attempted electronic interaction via a multimodal machine learning model (MLM) to detect a set of potential defects within the attempted electronic interaction, wherein analyzing the attempted electronic interaction from the set of communication channels associated with the attempted electronic interaction via a multimodal machine learning model (MLM) further comprises converting the set of electronic communication records into text-based data and wherein the set of potential defects comprises indicators associated with encountered errors within the attempted electronic interaction; and trigger a recovery process of the attempted electronic interaction upon identification of the set of potential defects within the attempted electronic interaction.

2. The system of claim 1, wherein the set of electronic communication records further comprises a set of audio data.

3. The system of claim 1, wherein the recovery process of the attempted electronic interaction via the multimodal MLM is an automated recovery.

4. The system of claim 1, wherein the recovery process of the attempted electronic interaction via the multimodal MLM is a guided recovery process.

5. The system of claim 1, wherein the set of communication channels further comprises interactive voice response calls.

6. The system of claim 1, wherein the set of communication channels further comprises chatbot logs.

7. A computer program product for electronic interaction recovery via multimodal machine learning models, the computer program product comprising at least one non-transitory computer-readable medium having computer-readable program code portions embodied therein, the computer-readable program code portions which when executed by a processing device are configured to cause a processor to perform the following operations:

receive an attempted electronic interaction from a set of communication channels, wherein the set of communication channels comprises a set of application logs and a set of electronic communication records and wherein the set of electronic communication records comprises a set of image-based data;

analyze the attempted electronic interaction from the set of communication channels associated with the attempted electronic interaction via a multimodal machine learning model (MLM) to detect a set of potential defects within the attempted electronic interaction, wherein analyzing the attempted electronic interaction from the set of communication channels associated with the attempted electronic interaction via a multimodal machine learning model (MLM) further comprises converting the set of electronic communication records into text-based data and wherein the set of potential defects comprises indicators associated with encountered errors within the attempted electronic interaction; and trigger a recovery process of the attempted electronic interaction upon identification of the set of potential defects within the attempted electronic interaction.

8. The computer program product of claim 7, wherein the set of electronic communication records further comprises a set of audio data.

9. The computer program product of claim 7, wherein the recovery process of the attempted electronic interaction via the multimodal MLM is an automated recovery.

10. The computer program product of claim 7, wherein the recovery process of the attempted electronic interaction via the multimodal MLM is a guided recovery process.

11. The computer program product of claim 7, wherein the set of communication channels further comprises interactive voice response calls.

12. The computer program product of claim 7, wherein the set of communication channels further comprises chatbot logs.

13. A computer-implemented method for electronic interaction recovery via multimodal machine learning models, the computer-implemented method comprising:

receiving an attempted electronic interaction from a set of communication channels, wherein the set of communication channels comprises a set of application logs and a set of electronic communication records and wherein the set of electronic communication records comprises a set of image-based data;

analyzing the attempted electronic interaction from the set of communication channels associated with the attempted electronic interaction via a multimodal machine learning model (MLM) to detect a set of potential defects within the attempted electronic interaction, wherein analyzing the attempted electronic interaction from the set of communication channels associated with the attempted electronic interaction via a multimodal machine learning model (MLM) further comprises converting the set of electronic communication records into text-based data and wherein the set of potential defects comprises indicators associated with encountered errors within the attempted electronic interaction; and triggering a recovery process of the attempted electronic interaction upon identification of the set of potential defects within the attempted electronic interaction.

14. The computer-implemented method of claim 13, wherein the set of electronic communication records further comprises a set of audio data.

15. The computer-implemented method of claim 13, wherein the recovery process of the attempted electronic interaction via the multimodal MLM is an automated recovery.

16. The computer-implemented method of claim 13, wherein the recovery process of the attempted electronic interaction via the multimodal MLM is a guided recovery process.

17. The computer-implemented method of claim 13, wherein the set of communication channels further comprises interactive voice response calls.

18. The computer-implemented method of claim 13, wherein the set of communication channels further comprises chatbot logs.

\* \* \* \* \*